(12) United States Patent
Siddiqui et al.

(10) Patent No.: US 12,287,681 B2
(45) Date of Patent: Apr. 29, 2025

(54) HINGE ASSEMBLY FOR MOBILE COMPUTING DEVICE

(71) Applicant: Microsoft Technology Licensing, LLC, Redmond, WA (US)

(72) Inventors: Kabir Siddiqui, Sammamish, WA (US); Daniel Clark Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 18/161,570

(22) Filed: Jan. 30, 2023

(65) Prior Publication Data

US 2023/0168720 A1    Jun. 1, 2023

Related U.S. Application Data

(63) Continuation of application No. 17/133,133, filed on Dec. 23, 2020, now Pat. No. 11,567,543.

(Continued)

(51) Int. Cl.
*G06F 1/16* (2006.01)
*E05D 3/12* (2006.01)
*E05D 11/00* (2006.01)

(52) U.S. Cl.
CPC .......... *G06F 1/1681* (2013.01); *G06F 1/1647* (2013.01); *E05D 3/122* (2013.01);
(Continued)

(58) Field of Classification Search
CPC ............ E05Y 2999/00; E05Y 220/462; E05Y 220/434; E05Y 220/474; E05Y 2800/45;
(Continued)

(56) References Cited

U.S. PATENT DOCUMENTS 10,088,875 B1    10/2018   Lin
10,241,548 B2 *   3/2019   Tazbaz .................. G06F 1/1641
(Continued)

OTHER PUBLICATIONS

"Notice of Allowance Issued in U.S. Appl. No. 17/104,595", Mailed Date: Feb. 21, 2023, 9 Pages.
(Continued)

*Primary Examiner* — Jack W Lavinder
*Assistant Examiner* — Matthew J Sullivan
(74) *Attorney, Agent, or Firm* — Alleman Hall & Tuttle LLP

(57) ABSTRACT

A hinged mobile computing device includes a first housing part and a second housing part coupled by a hinge assembly having a harness, a harness cover, a first hinge body, and a second hinge body. The harness is configured to accommodate flexible printed circuitry and a cable that extend from the first housing part to the second housing part via the hinge assembly. The hinge bodies include respective friction bands, each friction band being configured to engage a respective shaft formed on the harness and having a gear configured to mesh with a respective cog arranged within the harness cover to coordinate a timing of the rotation of the first and second housing parts between face-to-face and back-to-back orientations. The hinge assembly further includes a spring-loaded opening mechanism.

18 Claims, 14 Drawing Sheets

Related U.S. Application Data

(60) Provisional application No. 63/085,071, filed on Sep. 29, 2020.

(52) U.S. Cl.
CPC ..... *E05D 11/0081* (2013.01); *E05Y 2201/434* (2013.01); *E05Y 2201/462* (2013.01); *E05Y 2201/474* (2013.01); *E05Y 2800/45* (2013.01); *E05Y 2999/00* (2024.05)

(58) Field of Classification Search
CPC ... E05D 3/122; E05D 11/0081; G06F 1/1647; G06F 1/1683; G06F 1/1681
See application file for complete search history.

(56) References Cited

U.S. PATENT DOCUMENTS

| | | | |
|---|---|---|---|
| 10,253,804 B2 | 4/2019 | Park et al. | |
| 10,301,858 B2 | 5/2019 | Määttä | |
| 10,344,510 B2 * | 7/2019 | Siddiqui | E05D 3/122 |
| 10,545,541 B1 * | 1/2020 | Dighde | E05D 3/18 |
| 10,761,572 B1 * | 9/2020 | Siddiqui | E05D 7/00 |
| 10,795,416 B2 * | 10/2020 | Schmelzle | G06F 1/1683 |
| 10,845,850 B1 * | 11/2020 | Kang | E05D 3/122 |
| 11,091,944 B2 * | 8/2021 | Siddiqui | G06F 1/1616 |
| 11,093,008 B2 | 8/2021 | Hallar | |
| 11,099,611 B2 | 8/2021 | Hallar | |
| 11,106,248 B2 * | 8/2021 | Campbell | H04M 1/022 |
| 11,119,535 B2 | 9/2021 | Haworth et al. | |
| 11,543,861 B2 | 1/2023 | Park et al. | |
| 11,567,543 B2 * | 1/2023 | Siddiqui | G06F 1/1647 |
| 11,599,155 B2 | 3/2023 | Siddiqui | |
| 11,627,209 B2 | 4/2023 | Määttä | |
| 11,662,779 B2 | 5/2023 | Morrison | |
| 11,669,132 B2 * | 6/2023 | Siddiqui | G06F 1/1683 361/679.27 |
| 11,720,151 B2 | 8/2023 | Park | |
| 11,720,153 B2 * | 8/2023 | Hsu | G06F 1/1681 16/250 |
| 11,726,530 B2 * | 8/2023 | Kang | G06F 1/1681 361/679.27 |
| 11,762,430 B2 | 9/2023 | Kim | |
| 11,885,164 B2 * | 1/2024 | Yang | G06F 1/1681 |
| 11,889,006 B2 | 1/2024 | Kim | |
| 2017/0356226 A1 | 12/2017 | Määttä | |
| 2018/0024596 A1 | 1/2018 | Park et al. | |
| 2018/0166842 A1 | 6/2018 | Siddiqui | |
| 2018/0292860 A1 | 10/2018 | Siddiqui | |
| 2019/0094917 A1 | 3/2019 | Schmelzle et al. | |
| 2019/0211600 A1 | 7/2019 | Määttä | |
| 2019/0220064 A1 | 7/2019 | Park et al. | |
| 2019/0264483 A1 | 8/2019 | Määttä | |
| 2019/0278338 A1 | 9/2019 | Siddiqui | |
| 2021/0165466 A1 * | 6/2021 | Kang | G06F 1/1616 |
| 2021/0286411 A1 | 9/2021 | Park et al. | |
| 2021/0325937 A1 | 10/2021 | Siddiqui | |
| 2022/0100239 A1 | 3/2022 | Siddiqui | |
| 2023/0266804 A1 | 8/2023 | Siddiqui | |
| 2023/0359252 A1 * | 11/2023 | Kang | G06F 1/1616 |
| 2024/0040723 A1 * | 2/2024 | Feng | H04M 1/022 |

OTHER PUBLICATIONS

"Notice of Allowance Issued in U.S. Appl. No. 17/191,630", Mailed Date: Jan. 30, 2023, 12 Pages.

Notice of Allowance mailed on Jul. 10, 2024, in U.S. Appl. No. 18/310,664, 10 pages.

* cited by examiner

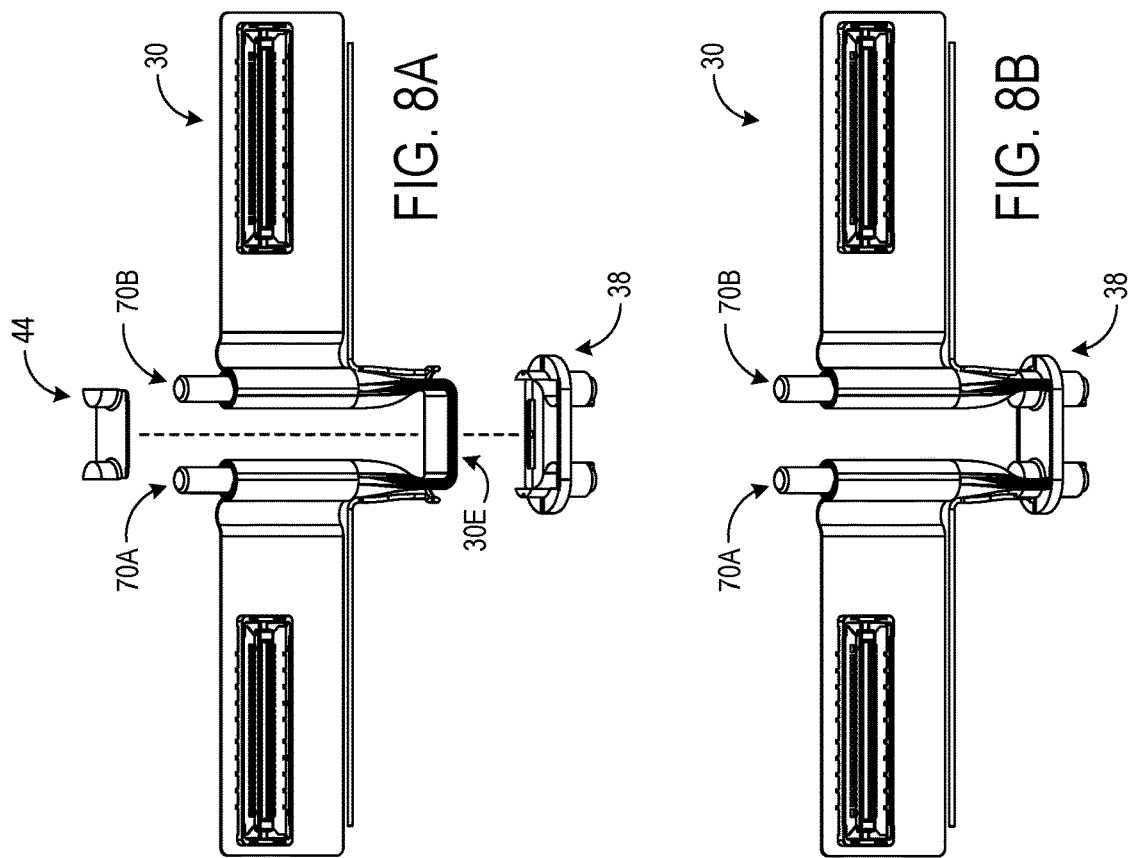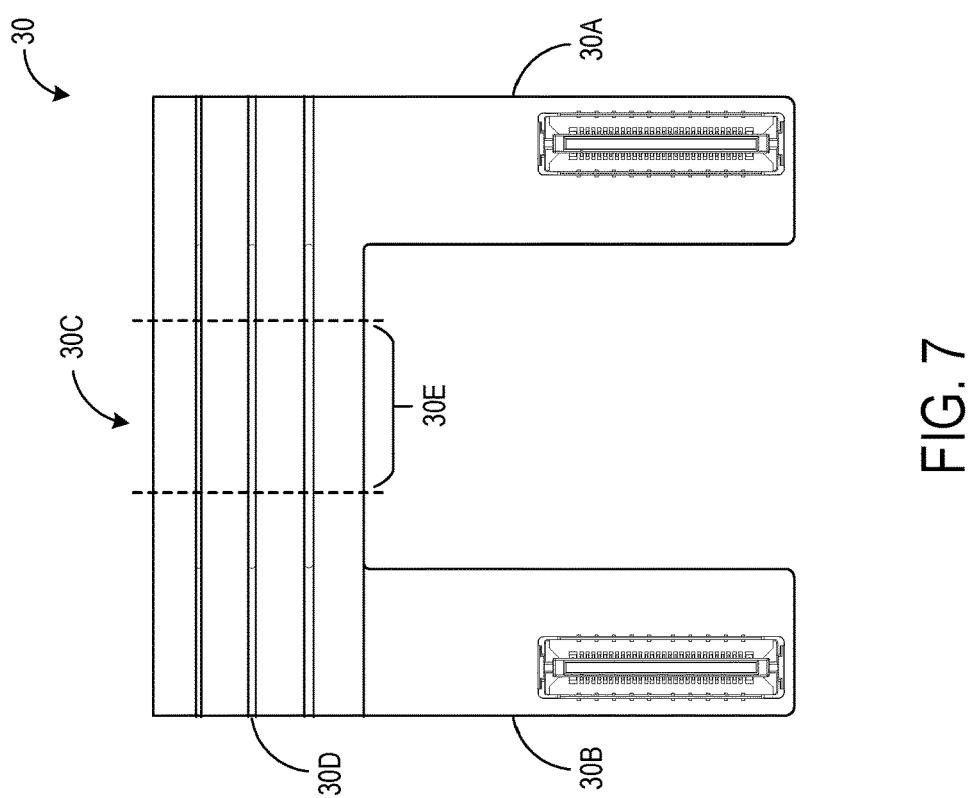

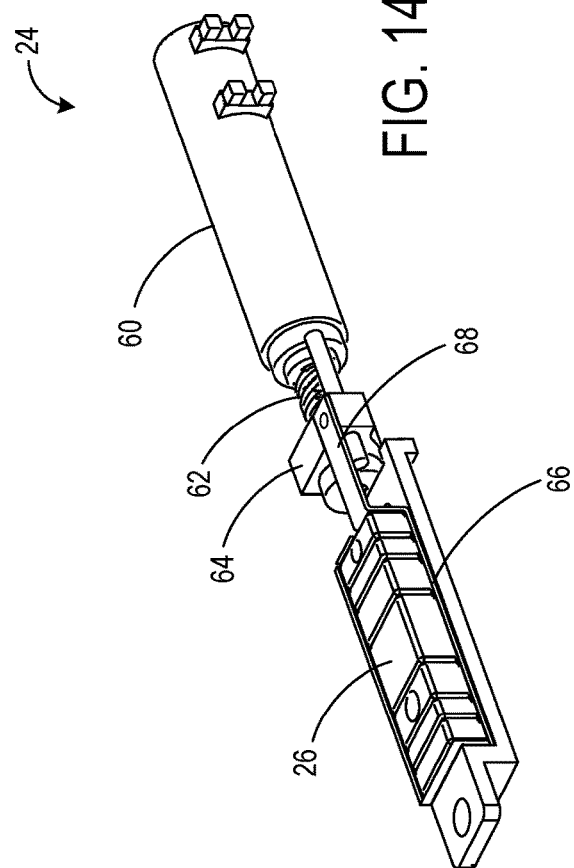
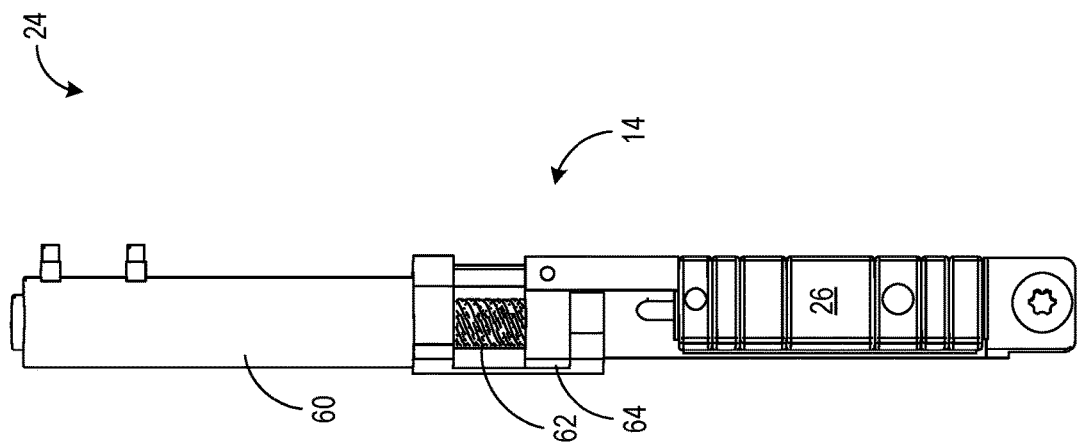

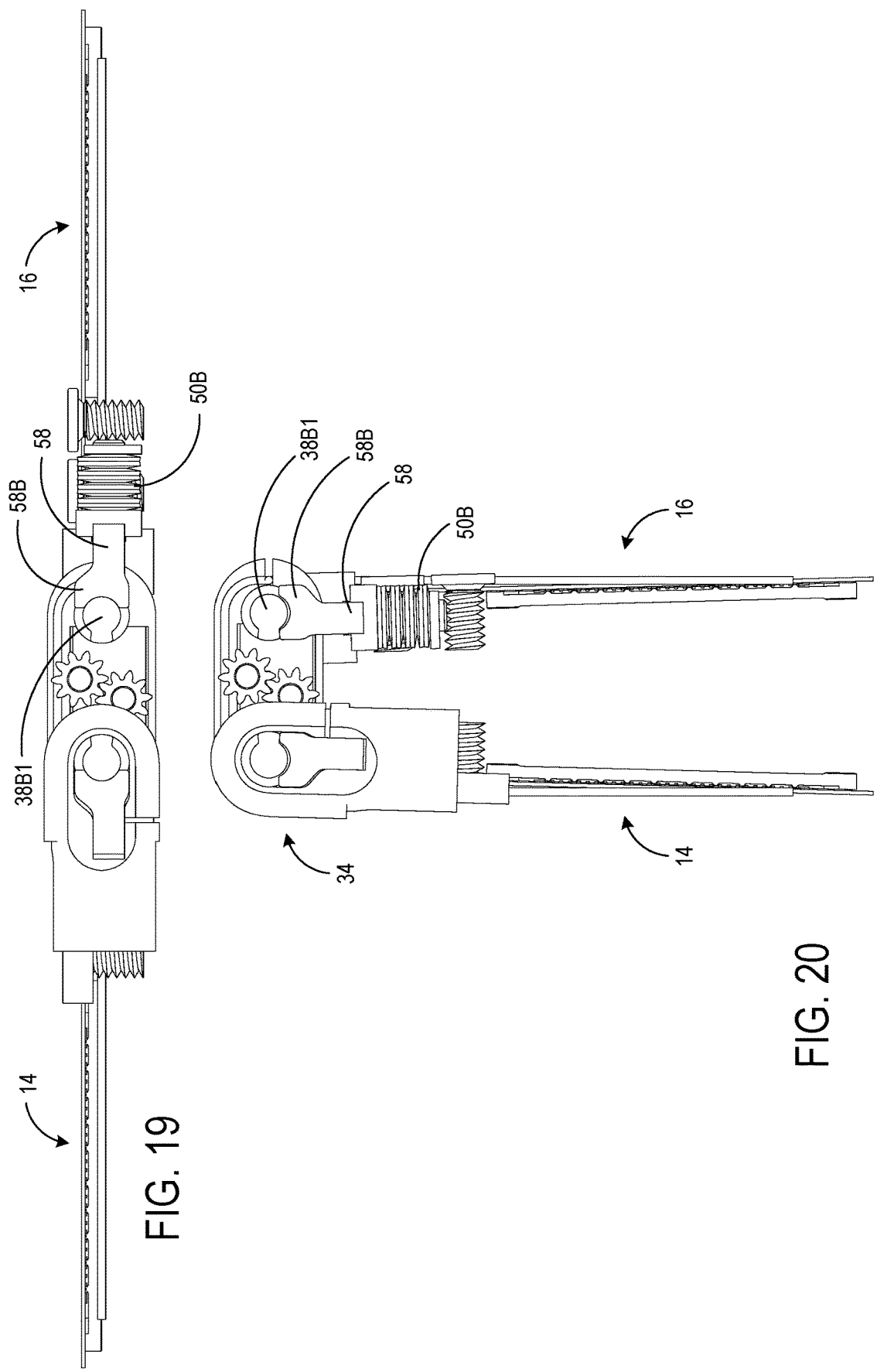

HINGE ASSEMBLY FOR MOBILE COMPUTING DEVICE

CROSS REFERENCE TO RELATED APPLICATIONS

This application is a continuation from U.S. Non-Provisional patent application Ser. No. 17/133,133, filed Dec. 23, 2020, which claims priority to U.S. Provisional Patent Application Ser. No. 63/085,071, filed Sep. 29, 2020, the entirety of each of which is hereby incorporated herein by reference for all purposes.

BACKGROUND

Hinged mobile computing devices with dual displays offer users the convenience of added screen space compared to mobile computing devices with a single display. Such devices may be used in a variety of device poses, offering users new ways of interacting with their devices. Thin bezels are often desired on mobile computing devices to increase the usable display area of the device while maintaining the same overall dimensions of the device. A device with thin bezels and hinged displays would offer even more screen space for users to enjoy, but heretofore challenges have existed to their development.

SUMMARY

To address the issues discussed herein, a mobile computing device is provided. According to one aspect, the mobile computing device may be configured as a hinged mobile computing device that includes a first housing part and a second housing part coupled by a hinge assembly. The first housing part may include a first display, the second housing part may include a second display, and the hinge assembly may be configured to permit the first and second displays to rotate from a face-to-face orientation to a back-to-back orientation. The hinge assembly may include a harness, a first integrally molded hinge body arranged in the first housing part, and a second integrally molded hinge body arranged in the second housing part. The first hinge body may include a first friction band comprising a first gear formed around a first void and configured to engage a first shaft formed on the harness, and the second hinge body may include a second friction band comprising a second gear formed around a second void and configured to engage a second shaft formed on the harness. The harness may be formed to have first recess configured to accommodate flexible printed circuitry and a second recess configured to hold a cable, and the flexible printed circuitry and the cable may extend from the first housing part to the second housing part via the hinge assembly.

In some configurations, the hinge assembly may include a harness cover, and the first and second gears may be configured to engage respective first and second cogs housed within the harness cover to control rotation of the first and second hinge bodies and coordinate a timing of the rotation of the first and second housing parts between the face-to-face and back-to-back orientations.

In some configurations, the hinge assembly may include a spring-loaded opening mechanism and an electro-magnetic closure system having a first magnet arranged in the first housing part and a second magnet arranged in the second housing part. The first magnet may be configured to align with the second magnet to secure the first and second housing parts in the closed orientation via a magnetic force. Engagement of a release button on one of the first and second housing parts may actuate an electric motor included in the first housing part to move the first magnet and reduce the magnetic force between the first and second magnets. The reduction of the magnetic force may permit the first housing part to separate from the second housing part at a predetermined angular orientation due to a torque of the spring-loaded opening mechanism.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1-20 are scale drawings.

FIG. 2 shows a schematic view of the mobile computing device of FIG. 1 with the displays removed.

FIG. 5 shows an exploded front perspective view of a hinge assembly, cable, and flexible printed circuitry of the mobile computing device of FIG. 1.

FIG. 6 shows an exploded rear perspective view of a hinge assembly, cable, and flexible printed circuitry of the mobile computing device of FIG. 1.

FIG. 7 shows a flexible printed circuitry of the mobile computing device of FIG. 1 in a flat state.

FIGS. 8A and 8B show exploded and assembled views, respectively, of a flexible printed circuitry and a harness of the mobile computing device of FIG. 1.

FIG. 10 shows an exploded view of a flexible printed circuitry and a hinge assembly of the mobile computing device of FIG. 1.

FIG. 11 shows an enlarged assembled view of a hinge assembly of the mobile computing device of FIG. 1.

FIG. 13 shows a side view of an electro-mechanical magnetic closure system of the mobile computing device of FIG. 1.

FIG. 14 shows a perspective view of an electro-mechanical magnetic closure system of the mobile computing device of FIG. 1.

FIG. 15 shows a front view of an electro-mechanical magnetic closure system of the mobile computing device of FIG. 1 in a closed configuration.

FIG. 16 shows a front view of an electro-mechanical magnetic closure system of the mobile computing device of FIG. 1 after actuation.

FIGS. 17 to 20 show the hinge assembly of the mobile computing device of FIG. 1 in different angular orientations.

DETAILED DESCRIPTION

Figure 1:
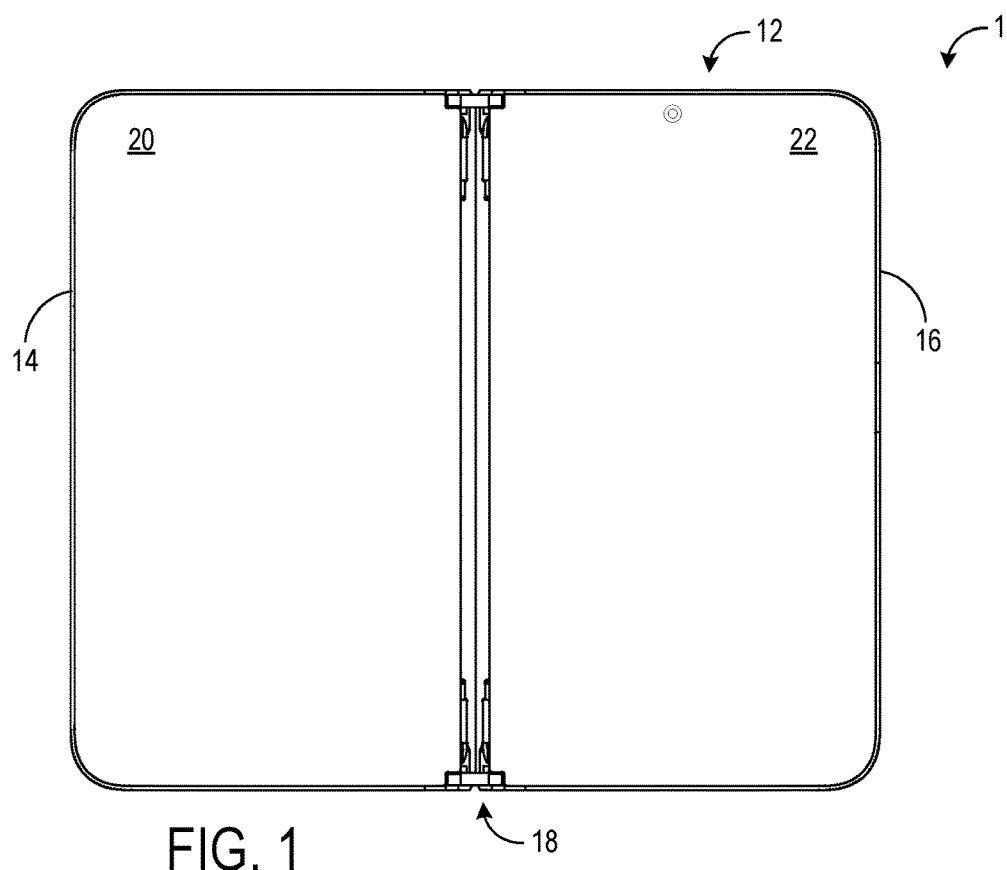
FIG. 1 shows a schematic view mobile computing device incorporating a hinge assembly according one example configuration of the present disclosure.

As schematically illustrated in FIG. 1, to address the above identified issues, a mobile computing device 10 is provided. The mobile computing device 10 may, for example, take the form of a smart phone device. In another example, the mobile computing device 10 may take other suitable forms, such as a tablet computing device, a wrist mounted computing device, or the like. The mobile computing device 10 may include a housing 12, which, for example, may take the form of a casing surrounding internal electronics and providing structure for displays, sensors, speakers, buttons, etc. The housing 12 may have a first housing part 14 and a second part housing 16 coupled by a hinge assembly 18. The first housing part 14 may include a first display 20, and the second housing part 16 may include a second display 22. The hinge assembly 18 may be configured to permit the first and second displays 20, 22 to rotate between angular orientations from a face-to-face angular orientation to a back-to-back angular orientation.

In one implementation, the face-to-face angular orientation is defined to have an angular displacement as measured from the first display 20 to the second display 22 of between 0 degrees and 90 degrees, an open angular orientation is defined to be between 90 degrees and 270 degrees, and the back-to-back orientation is defined to be between 270 degrees and 360 degrees. Alternatively, an implementation in which the open orientation is not used to trigger behavior may be provided, and in this implementation, the face-to-face angular orientation may be defined to be between 0 degrees and 180 degrees, and the back-to-back angular orientation may be defined to be between 180 degrees and 360 degrees. In either of these implementations, when tighter ranges are desired, the face-to-face angular orientation may be defined to be between 0 degrees and 60 degrees, or more narrowly to be between 0 degrees and 30 degrees, and the back-to-back angular orientation may be defined to be between 300 degrees and 360 degrees, or more narrowly to be between 330 degrees and 360 degrees. The 0 degree position may be referred to as fully closed in the fully face-to-face angular orientation and the 360 degree position may be referred to as fully open in the back-to-back angular orientation. In implementations that do not use a double hinge, and which are not able to rotate a full 360 degrees, fully open and/or fully closed may be greater than 0 degrees and less than 360 degrees.

Figure 2:
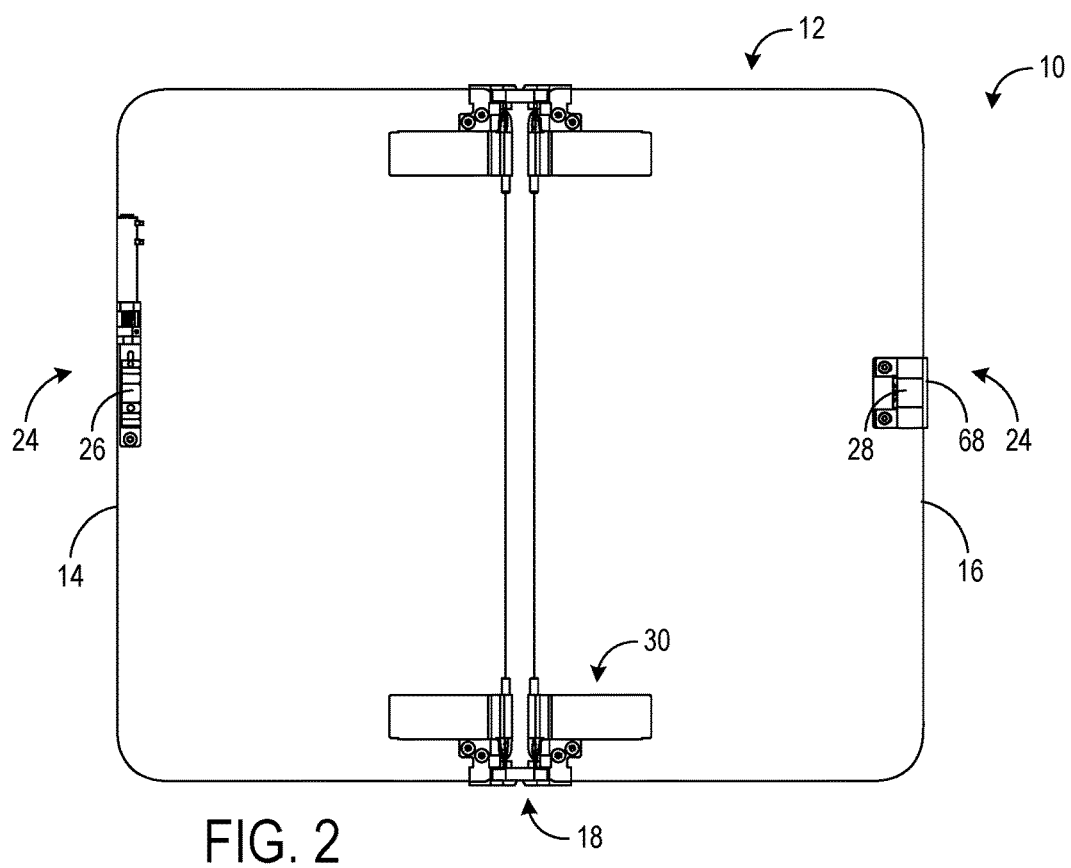

FIG. 2 shows a schematic view of the mobile computing device of FIG. 1 with the displays removed. The mobile computing device 10 may include flexible printed circuitry 30 arranged in the first and second housing parts 14, 16. As illustrated and described in detail below, the flexible printed circuitry 30 is routed from the first housing part 14 to the second housing part 16 via the hinge assembly 18. The utilization of the flexible printed circuitry 30 in place of conventionally used coaxial cable allows the hinge assembly 18 to have a smaller profile in the mobile computing device 10, which in turn reduces the size of the bezel and provides more available screen space on the first and second displays 20, 22.

As shown in FIG. 2 and described in detail below, the mobile computing device 10 may include an electro-magnetic closure system 24 having a first magnet 26 arranged in the first housing part 14 and a second magnet 28 arranged in the second housing part 16. When aligned, the first and second magnets 26, 28 may be configured to secure the first and second housing parts 14, 16 of the mobile computing device 10 in a closed position via a magnetic force. It will be appreciated that the first and second magnets 26, 28 may be configured as single magnets or as a gangs of magnets. When configured as gangs of magnets, the first and second magnets 26, 28 may be arranged as a Halbach array.

A release button 68 may be pressed to open the mobile computing device 10 from a closed position. The release button 68 may incorporate such features as biometric sensor and/or a power switch. The mobile computing device illustrated in FIGS. 1 and 2 includes two hinge assemblies; however, a single hinge assembly 18 will be described herein for the sake of clarity. When a mobile computing device is equipped with two hinge assemblies arranged at top and bottom interfaces between the first and second housing parts 14, 16, it will be appreciated that the hinge assemblies are substantially the same, but rotated at 180 degrees with respect to one another.

Figure 3A:
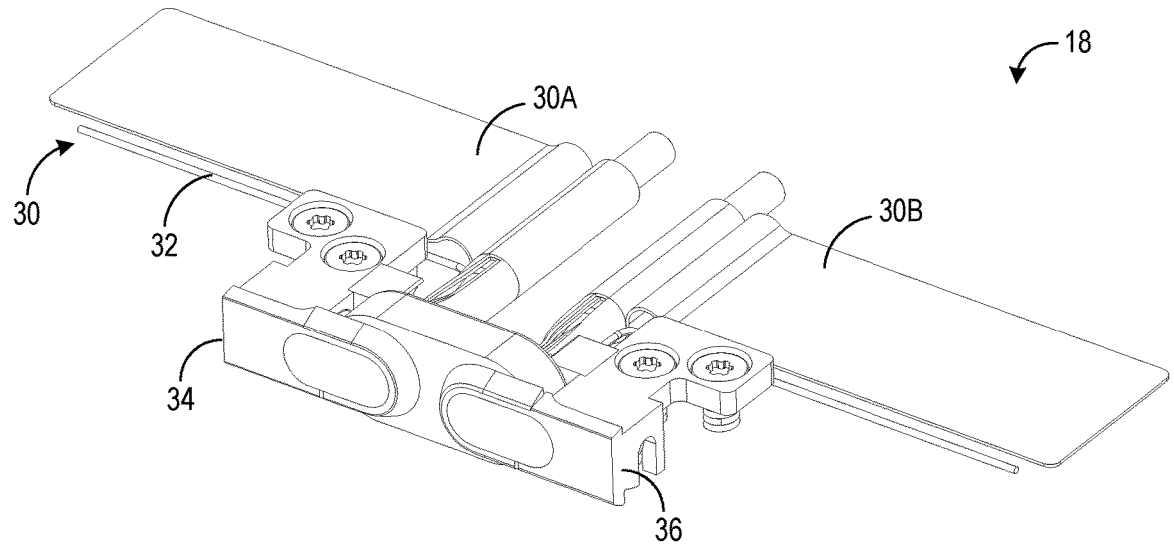
FIGS. 3A and 3B show front top and front bottom perspective views, respectively, of a hinge assembly, cable, and flexible printed circuitry of the mobile computing device of FIG. 1.
Figure 3B:
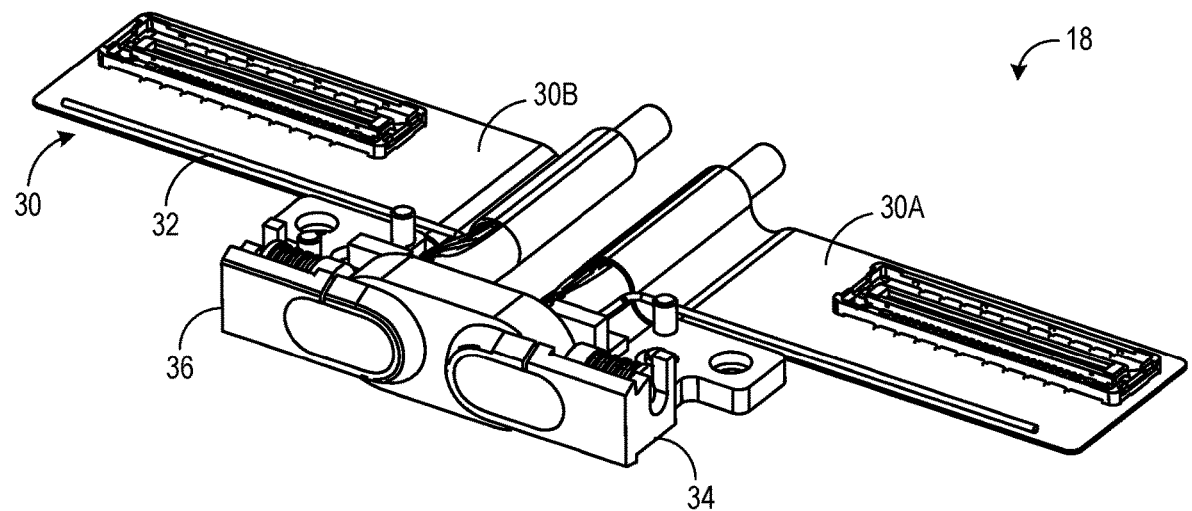
Figure 4A:
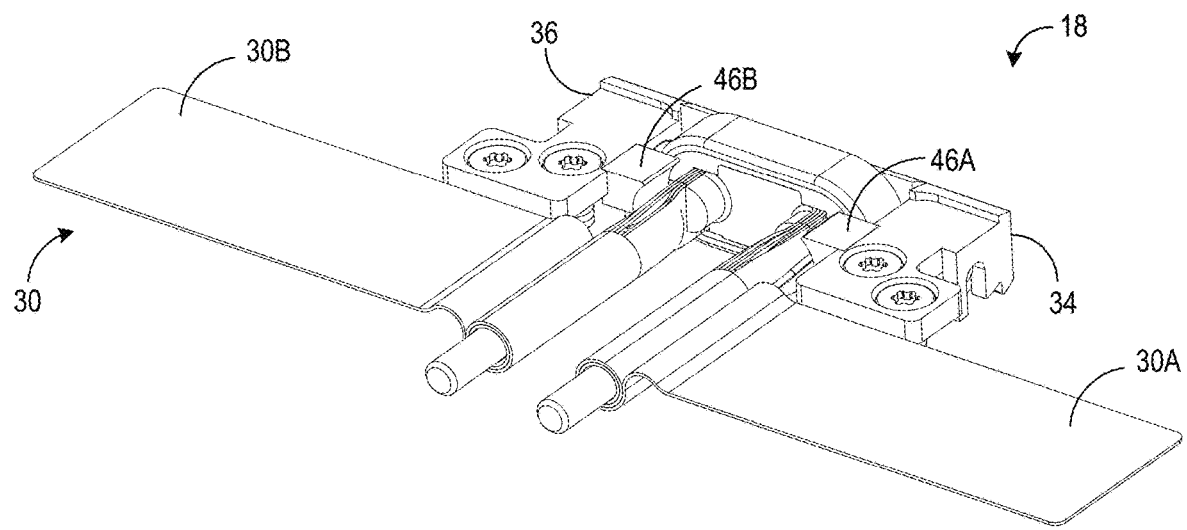
FIGS. 4A and 4B show rear top and rear bottom perspective views, respectively, of a hinge assembly, cable, and flexible printed circuitry of the mobile computing device of FIG. 1.
Figure 4B:
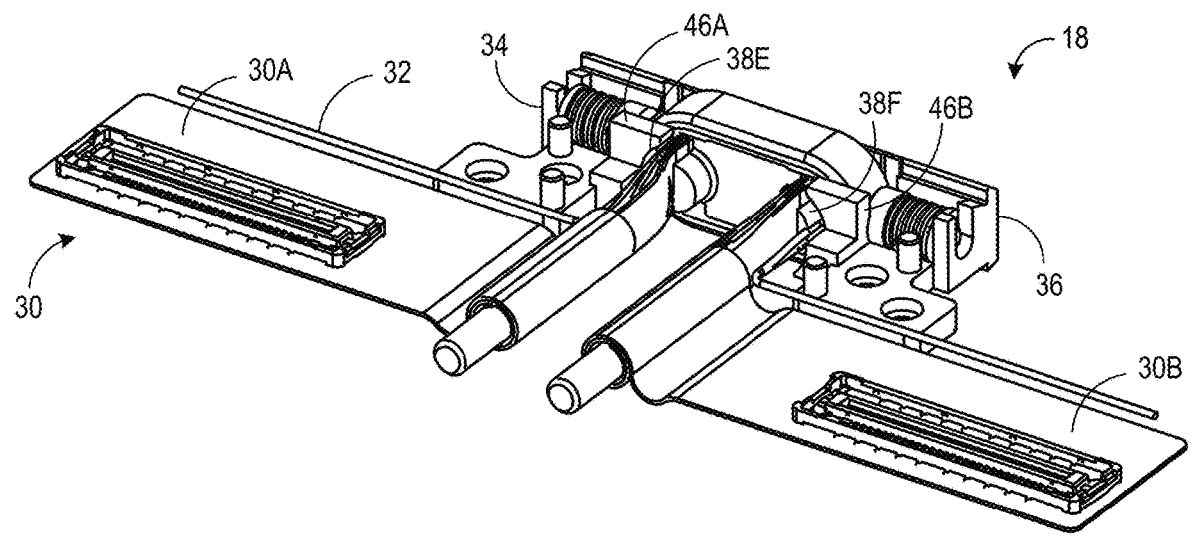

FIGS. 3A and 3B illustrate front top and front bottom perspective views, respectively, of the hinge assembly 18, and FIGS. 4A and 4B illustrate rear top and rear bottom perspective views, respectively, of the hinge assembly 18. In an assembled state, the hinge assembly 18 may be configured to route the flexible printed circuitry 30 and a flexible cable 32 from the first housing part 14 to the second housing part 16. The cable 32 is configured to connect an antenna (not shown) from one of the first and second housing parts 14, 16 to a main board arranged in the other of the first and second housing parts 14, 16. It will be appreciated that the cable may be any type of cable suitable for connecting to an antenna. In the embodiment described herein, the cable 32 is configured as a radio frequency (RF) coaxial cable 32. As described in detail below with reference to FIGS. 7, 8 and 10, the flexible printed circuitry 30 may comprise a first wing 30A and a second wing 30B joined via a folding portion 30C that is arranged in the hinge assembly 18. The hinge assembly 18 may include a first integrally molded hinge body 34 configured to be arranged in the first housing part 14 and a second integrally molded hinge body 36 configured to be arranged in the second housing part 16. The integrally molded hinge bodies 34, 36 may be formed of a metallic material via an injection molding process, such as metal injection molding (MIM).

Figure 5:
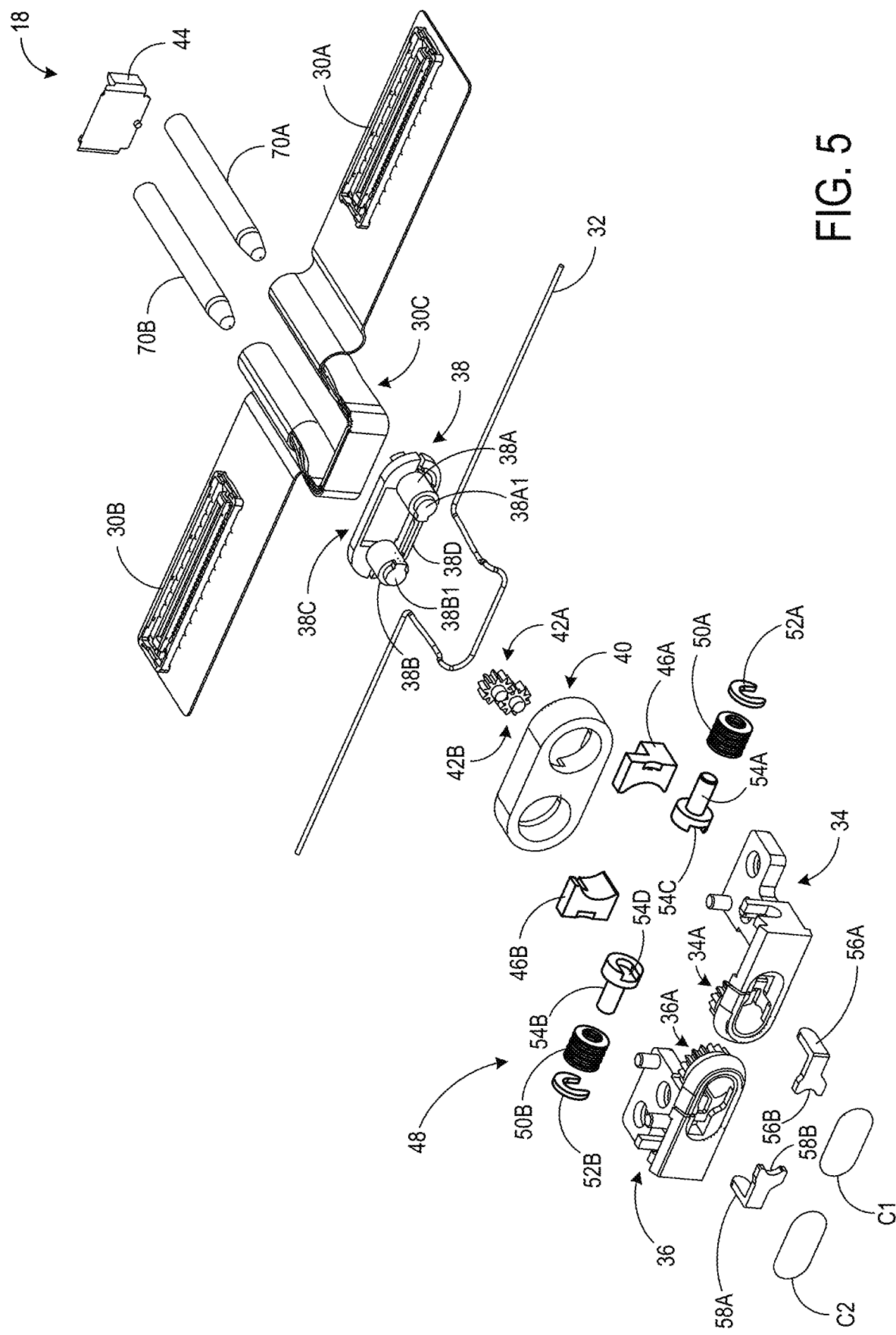
Figure 6:
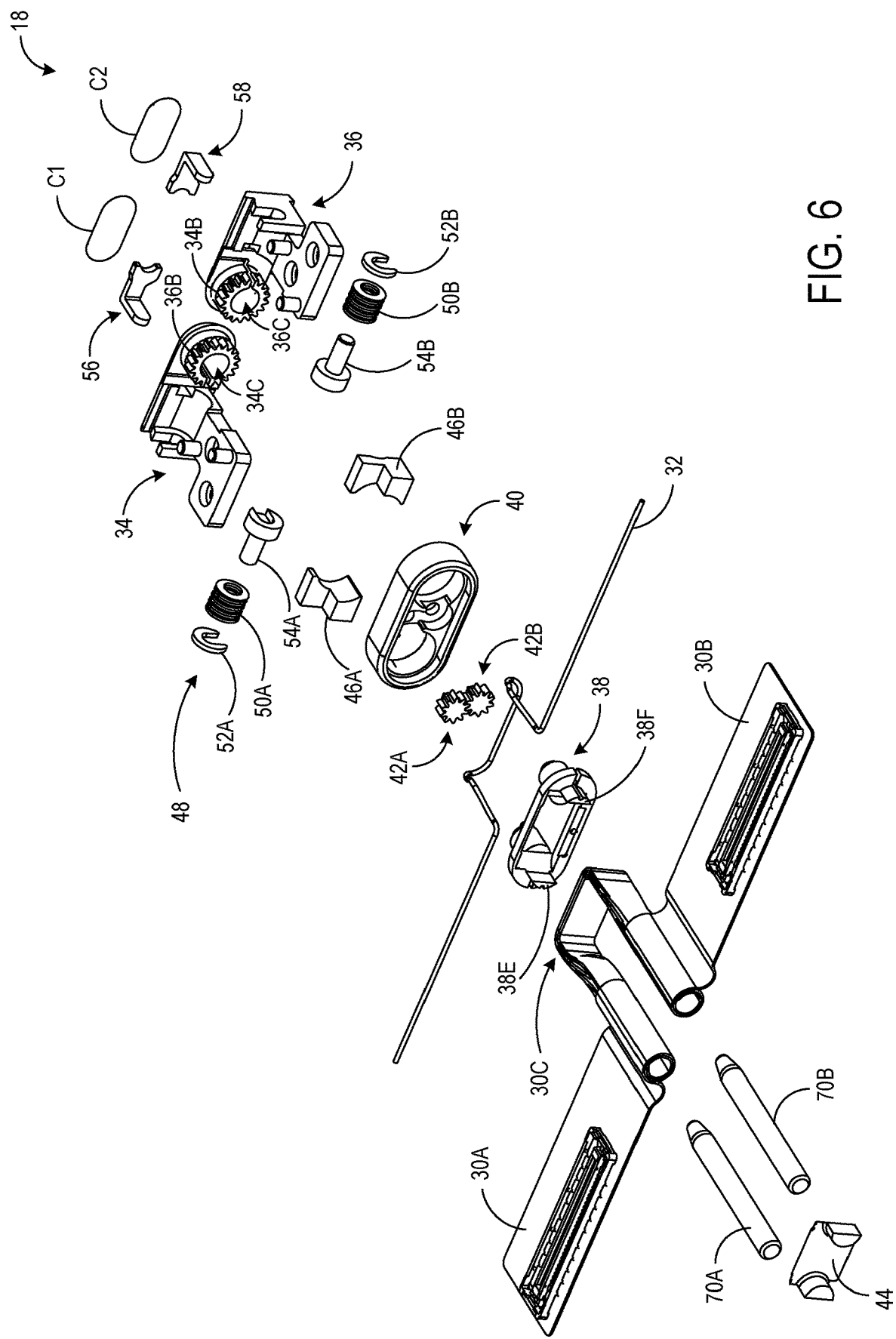

Exploded front and rear perspective views of the hinge assembly 18, flexible printed circuitry 30, and the RF coaxial cable 32 are shown in FIGS. 5 and 6, respectively. As illustrated, the first hinge body 34 may be molded to include a first friction band 34A comprising a first gear 34B formed around a first void 34C. Likewise, the second hinge body 36 may be molded to include a second friction band 36A comprising a second gear 36B formed around a second void 36C.

In addition to the first and second hinge bodies 34, 36, the hinge assembly 18 may further include a harness 38 having a first shaft 38A and a second shaft 38B, a harness cover 40, and first and second cogs 42A, 42B configured to reside within the harness cover 40. In an assembled state, the first and second shafts 38A, 38B may be received by the respective first and second friction bands 34A, 36A, and the first and second cogs 42A, 42B may mesh with the respective first and second gears 34B, 36B. Engagement of the shafts 38A, 38B with the friction bands 34A, 36A may permit rotation of the first and second hinge bodies 34, 36 around respective first and second shafts 38A, 38B, and thus permit rotation of the first and second housing parts 14, 16 between the angular orientations described above.

The friction bands 34A, 36A provide a frictional force against the respective first and second shafts 38A, 38B that prevents the first and second housing parts 14, 16 from rotating in the absence of an opening or closing force exerted by a user. However, the user may easily overcome the frictional force to move the first and second housing parts 14, 16 to a desired angular orientation. It will be appreciated that the first and second friction bands 34A, 36A are configured to be externally facing. This design allows the diameter of the friction bands 34A, 36A and shafts 38A, 38B to be larger, thereby increasing the torque and strength of the engagement of the shafts 38A, 38B with respective friction bands 34A, 36A. This configuration further facilitates a variability in the friction torque variable that enhances the behavior of a spring-loaded opening mechanism 48 included in the hinge assembly, as described below. Additionally, engagement of the gears 34B, 36B with the cogs 42A, 42B may control the rotation of the first and second hinge bodies 34, 36 and coordinate a timing of the rotation of the first and second housing parts 14, 16 between the face-to-face and back-to-back orientations.

The harness 38 may be formed to further include a first recess 38C configured to accommodate the flexible printed circuitry 30 and a second recess 38D configured to hold the RF coaxial cable 32. The hinge assembly 18 may further include a plate 44 configured to attach to the harness 38 and secure the flexible printed circuitry 30 in the harness 38. The plate 44 may be spot-welded to the harness 38. Alternatively, the plate 44 may be bonded to the harness 38 via another method, such as adhesive or glue.

In an assembled state, with reference to FIGS. 3A, 3B, 4A, and 4B, the flexible printed circuitry 30 and the RF coaxial cable 32 may extend from the first housing part 14 to the second housing part 16 via the hinge assembly 18. In the illustrated embodiment, the first and second recesses 38C, 38D are arranged on opposite sides of the harness 38. However, it will be appreciated that the first and second recesses 38C, 38D may alternately be arranged on a same side of the harness 38. As described in detail below, support rods 70A, 70B may be bonded to the flexible printed circuitry 30.

The harness 38 may further include a third shaft 38E and a fourth shaft 38F arranged opposite the first and second shafts 38A, 38B. The third and fourth shafts 38E, 38F may stabilize the flexible printed circuitry 30 when it is seated in the first recess 38C of the harness 38.

To prevent breakage of the first and/or second displays 20, 22 in the event that the mobile computing device 10 is bumped or dropped, the hinge assembly 18 may include hinge guide stoppers to prevent the hinge assembly 18 from contacting the first and/or second displays 20, 22. To this end, a first hinge guide stopper 46A may be positioned between the first hinge body 34 and the third shaft 38E of the harness, and a second hinge guide stopper 46B may be arranged between the second hinge body 36 and the fourth shaft 38F of the harness. When the mobile computing device 10 is dropped or bumped, the hinge guide stoppers 46A, 46B are configured to absorb the impact and provide a spatial cushion between hinge assembly 18 and the first and/or second displays 20, 22. The first and second hinge guide stoppers 46A, 46B may be placed after the flexible printed circuitry 30 is installed in the hinge assembly 18, and the hinge guide stoppers 46A, 46B may be secured to respective hinge bodies 34, 36 via welding. However, it will be appreciated that the first and second hinge guide stoppers 46A, 46B may be secured to respective hinge bodies 34, 36 with another method, such as a bonding adhesive, for example.

The hinge assembly 18 may include a spring-loaded opening mechanism 48. As shown in FIGS. 5 and 6, with reference to FIGS. 12A and 12B, the spring-loaded opening mechanism 48 may include a first spring 50A and a first spring seat 52A arranged on a first pin 54A and positioned in the first hinge body 34, and a second spring 50B and a second spring seat 52B arranged on a second pin 54B and positioned in the second hinge body 36. The spring-loaded opening mechanism 48 may further include a first follower 56 and a second follower 58. The first and second followers may be formed such that one end of the follower is orthogonal with respect to the other end of the follower. With this configuration, a first end 56A of the first follower 56 may be disposed in a head 54C of the first pin 54A, and a second end 56B of the first follower 56 may be engaged with a first cam 38A1 of the first shaft 38A of the harness 38. Likewise, a first end 58A of the second follower 58 may be disposed in a head 54D of the second pin 54B, and a second end 58B of the second follower 58 may be engaged with a second cam 38B1 of the first shaft 38B of the harness 38. As described below with reference to FIG. 17, the second ends 56B, 58B of the followers 56, 58 may be formed to have a concave face, and the cams 38A1, 38B1 may be formed to have a substantially arcuate surface. In an assembled state, hinge covers C1, C2 may be attached to the first and second hinge bodies 34, 36, respectively, to protect the components of the hinge assembly 18.

FIGS. 7, 8A, and 8B illustrate how the flexible printed circuitry 30 is configured to fold such that the folding portion 30C can be accommodated in the harness 38 of the hinge assembly 18. FIG. 7 shows a rear view of the flexible printed circuitry 30 in an unfolded, flat state. Prior to folding, the flat flexible printed circuitry 30 is substantially U-shaped, with the first wing 30A and the second wing 30B joined via the folding portion 30C. The folding portion 30C includes one or more pleats and/or slits 30D that may be horizontally folded to be pleated, for example, with reference to the position of the flexible printed circuitry 30 illustrated in FIG. 7. Once pleated, the folding portion 30C may be vertically folded along two axes, indicated by dashed lines in FIG. 7, to form a seating portion 30E. The U-shape of the flexible printed circuitry 30 facilitates the positioning of the first and second wings 30A, 30B in the respective housing parts 14, 16 when the folding portion 30C is pleated and folded to create the seating portion 30E that is subsequently seated in the first recess 38C of the harness 38, as shown in FIG. 8A. Further, the seating portion 30E of the flexible printed circuitry 30 that traverses the hinge assembly 18 via the harness 38 can be made to be substantially flat, thereby permitting the hinge assembly 18 to have a reduced profile such that the size of the bezel can be minimized, and the available screen space maximized.

FIGS. 8A and 8B show exploded and assembled, respectively, of the flexible printed circuitry 30 in a folded state, and engaged with the plate 44 and the harness 38. As described above, in the folded state, the folding portion 30C is pleated via the slits 30D and bent to form the seating portion 30E that is seated in the first recess 38C of the harness 38. Support rods 70A, 70B are bonded to the flexible printed circuitry at locations adjacent the wings 30A, 30B. As described above, the plate 44 may be configured to attach to the harness 38 and secure the flexible printed circuitry 30 therebetween. FIG. 8B shows the flexible printed circuitry 30 in the folded state and engaged with the harness 38 and the plate 44. In an assembled state of the mobile computing device 10, the folding portion 30C of the flexible printed circuitry 30 resides within the first recess 38C of the harness 38, the first wing 30A is bonded to the first support rod 70A and arranged in the first housing part 14, and the second wing 30B is bonded to the second support rod 70B and arranged in the second housing part 16.

Figure 9A:
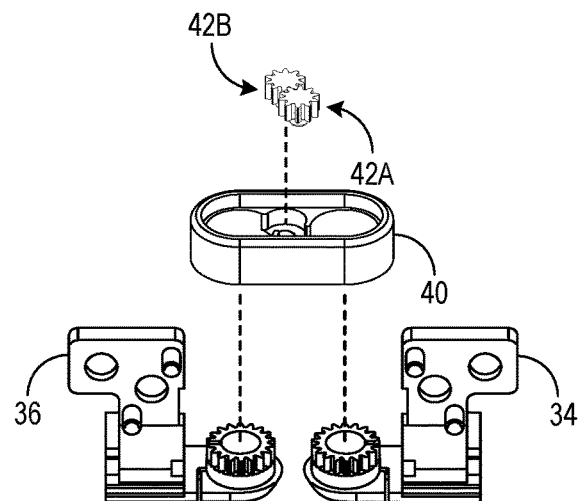
FIGS. 9A and 9B show exploded and assembled views, respectively, of hinge bodies, cogs, and a harness cover of a hinge assembly of the mobile computing device of FIG. 1.
Figure 9B:
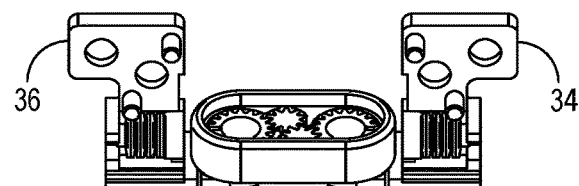

FIGS. 9A and 9B show exploded and assembled views, respectively, of the spatial relationship of the cogs 42A, 42B and the harness cover 40 with the hinge bodies 34, 36 of the hinge assembly 18. As illustrated, the harness cover 40 may be configured to receive the first and second cogs 42A, 42B and hold them in alignment to mesh with the first and second gears 34B, 36B, respectively.

Figure 10:
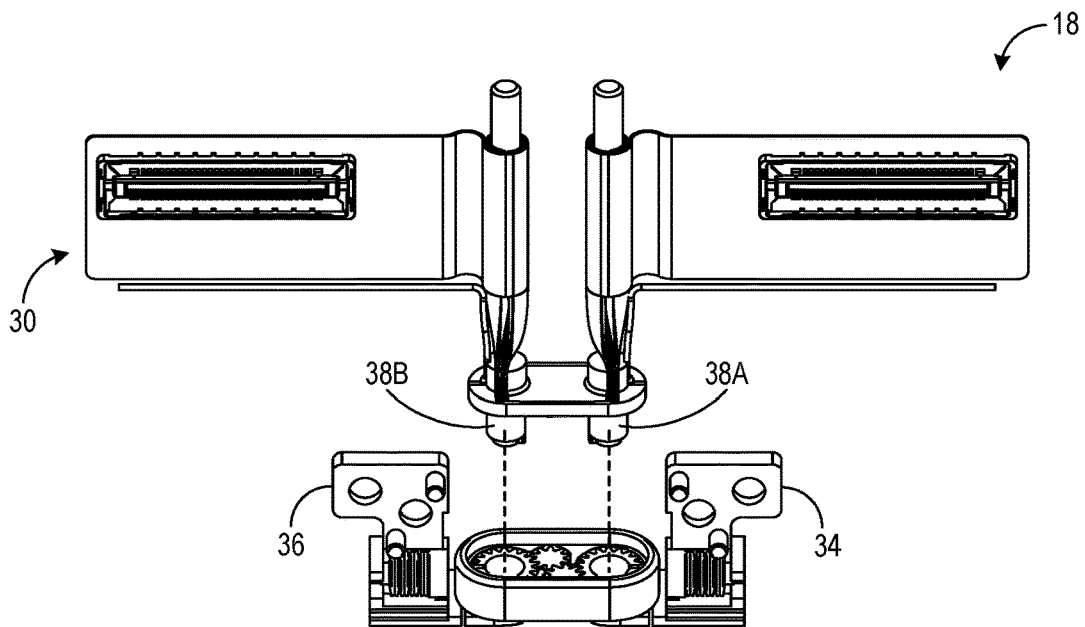

With reference to FIGS. 8B and 9B, FIG. 10 shows an exploded view of the flexible printed circuitry 30 and the hinge assembly 18 sans the harness 38. As shown, the folded flexible printed circuitry 30 may be sandwiched between the plate 44 and the harness 38. To assemble the hinge assembly 18, the first and second shafts 38A, 38B of the harness 38 may be inserted into the respective friction bands 34A, 36A that are integrally formed in the hinge bodies 34, 36, as illustrated in FIG. 10. The harness 38 may be seated in the harness cover 40, which houses the first and second gears 34B, 36B and the first and second cogs 42A, 42B. As such, each component of the hinge assembly 18 is designed to efficiently and compactly engage with other components to reduce the size of the hinge assembly 18, which reduces the size of the bezel and provides more available screen space on the first and second displays 20, 22 of the mobile computing device 10.

Figure 11:
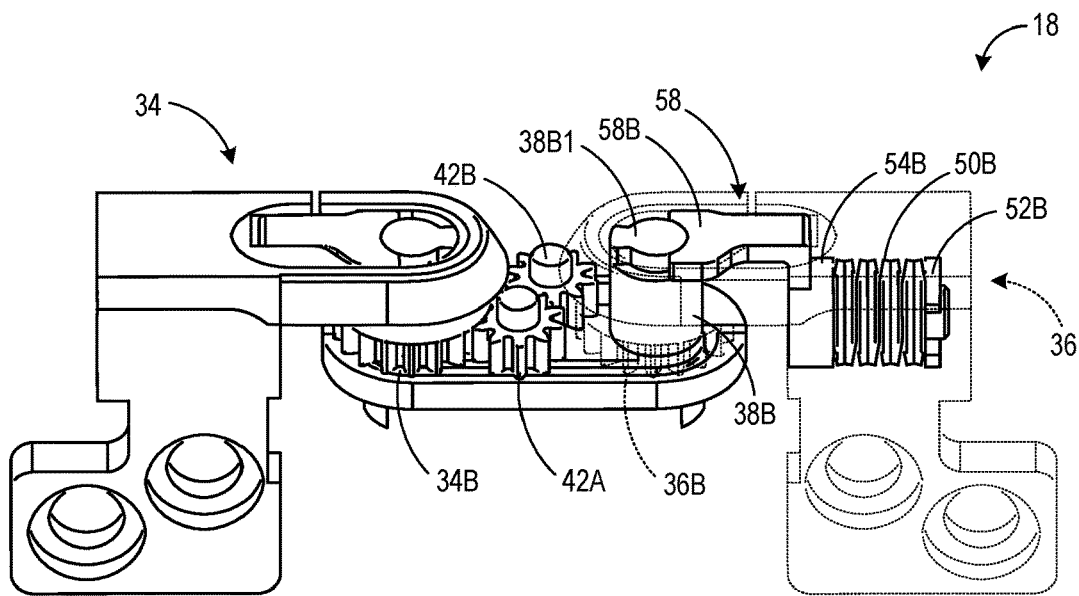

An enlarged assembled view of the hinge assembly 18 is shown in FIG. 11. It will be appreciated that the second hinge body 36 is shown in dotted line such that internal components of the hinge assembly 18 are visible. As illustrated in FIG. 11 and described above, in an assembled state, the first and second shafts 38A, 38B of the harness 38 may be configured to respectively engage the first and second hinge bodies 34, 36 via respective voids 34C, 36C formed in the respective friction bands 34A, 36A. The first and second cogs 42A, 42B may mesh with the respective first and second gears 34B, 36B. This configuration may permit rotation of the first and second hinge bodies 34, 36 around respective first and second shafts 38A, 38B, and engagement of the gears 34B, 36B with the cogs 42A, 42B may control the rotation of the first and second hinge bodies 34, 36 to coordinate the timing of the rotation of the first and second housing parts 14, 16 between the face-to-face and back-to-back orientations. Further, as described below with reference to FIGS. 12A and 12B, the first and second cams 38A1, 38B1 on the shafts 38A, 38B of the harness may be configured as components of the spring-loaded opening mechanism 48.

Figure 12A:
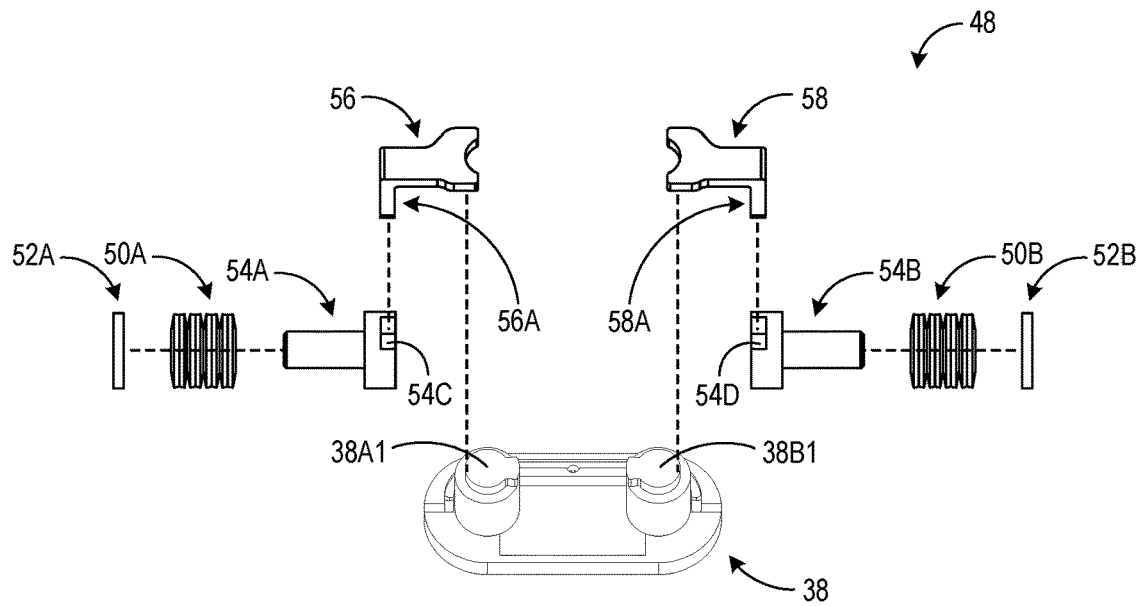
FIGS. 12A and 12B show exploded and assembled views, respectively, of a spring-loaded opening mechanism of the mobile computing device of FIG. 1.
Figure 12B:
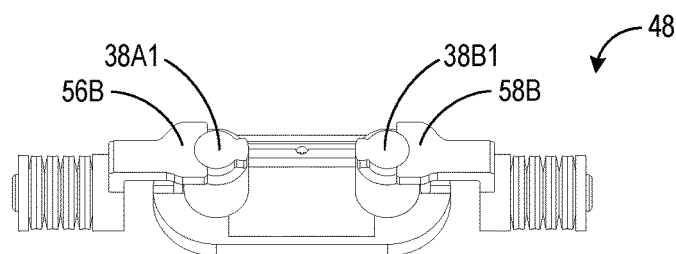

FIGS. 12A and 12B show exploded and assembled views, respectively, of the spring-loaded opening mechanism 48. As described above with reference to FIGS. 5 and 6, the first spring 50A and the first spring seat 52A may be arranged on the first pin 54A, and the second spring 50B and the second spring seat 52B may be arranged on the second pin 54B. The first end 56A of the first follower 56 may fit in a recess in the head 54C of the first pin 54A. Likewise, the first end 58A of the second follower 58 may fit in a recess in the head 54D of the second pin 54B. In an assembled state, as shown in FIG. 12B, the second end 56B of the first follower 56 may engage the first cam 38A1 of the first shaft 38A of the harness 38, and the second end 58B of the second follower 58 may engage the second cam 38B1 of the first shaft 38B of the harness 38.

As mentioned above and described in detail below, the mobile computing device 10 may include an electro-magnetic closure system 24 that secures the first and second housing parts 14, 16 of the mobile computing device 10 in a closed position via a magnetic force. It will be appreciated that the magnetic force is strong enough to overcome the torque created by the spring-loaded opening mechanism. When the first and second housing parts 14, 16 are magnetically secured in the closed orientation, the first and second springs 50A, 50B are held in a compressed state by the engagement of the cams 38A1, 38B1 with the respective followers 56, 58. Reduction of the magnetic force permits the first and second housing parts 14, 16 to separate due to the torque of the spring-loaded opening mechanism 48. Specifically, the first and second springs are released from the compressed state, which releases the potential energy stored in the springs 50A, 50B. The potential energy released from the springs 50A, 50B is transferred to the first and second followers 56, 58 via the engagement of the first ends 56A, 56B of the first and second followers 56, 58 with the head 54C of the first pin 54A and the head 54D of the second pin 54B, respectively. This causes the second ends 56B, 58B of the first and second followers 56, 58 to rotate around the cams 38A1, 38B1, thereby rotating the first and second hinge bodies 34, 36 to separate the first housing part 14 from the second housing part 16 to the predetermined angular orientation.

FIGS. 13 and 14 are side and perspective views, respectively, of the electro-magnetic closure system 24 as it would appear in the first housing part 14 when the first and second housing parts 14, 16 are in the closed configuration. As shown, the electric motor 60 includes a threaded portion 62 engaged with a nut 64. The nut 64 is attached to a magnet housing 66 that holds the first magnet 26 via a housing arm 68.

Figure 15:
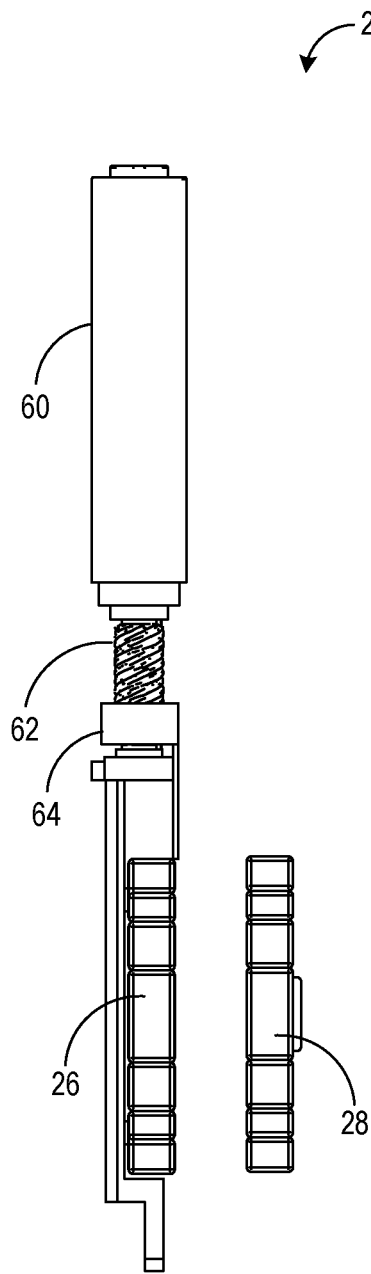

As described above, the magnetic force created by alignment of the first and second magnets 26, 28 secures the first and second housing parts 14, 16 in a closed configuration. FIG. 15 shows a front view of a spatial relationship between the first and second magnets 26, 28 as they would appear when the first and second housing parts 14, 16 are in the closed configuration. As illustrated, the first magnet 26 is positioned proximate an electric motor 60. As discussed below, actuation of the electric motor 60 moves the first magnet 26 in a vertical direction with respect to the first housing part 14 of the mobile computing device 10. Displacement of the first magnet 26 results in a misalignment between the first and second magnets 26, 28, thereby reducing the magnetic force and releasing the spring-loaded opening mechanism 48.

Figure 16:
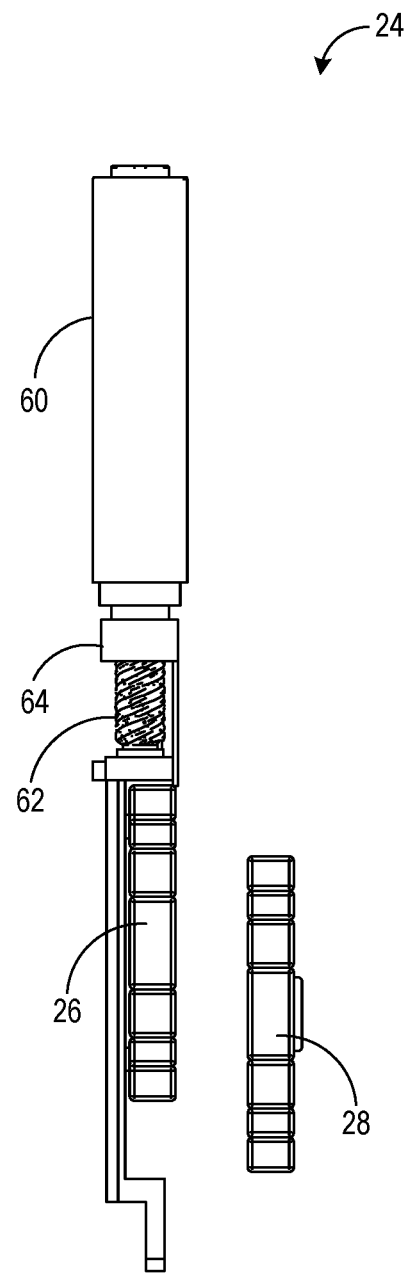

FIG. 16 shows a front view of a spatial relationship between the first and second magnets 26, 28 as they would appear in the first and second housing parts 14, 16 after engagement of a release button 68 (shown in FIG. 2). When the release button 68 is pressed, such as by a digit of a user, the electric motor 60 may be actuated to rotate the threaded portion 62, which causes the nut 64 to travel along the threaded portion 62 and move the first magnet 26 toward the electric motor 60, as illustrated in FIG. 16. The movement of the first magnet 26 reduces the magnetic force between the first and second magnets 26, 28, which may release the spring-loaded opening mechanism 48, thereby causing the first housing part 14 to separate from the second housing part 16 at a predetermined angular orientation. While the release button 68 is illustrated as being on the second housing part 16 in the embodiment shown in FIG. 1, it will be appreciated that the release button may be arranged on either of the first or second housing parts 14, 16.

Figure 17:
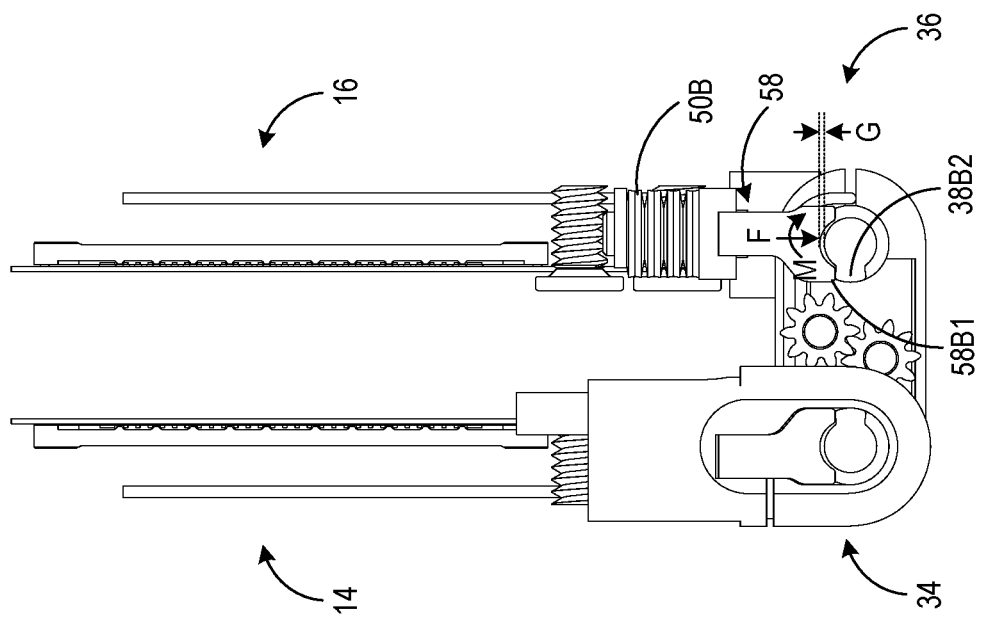

FIGS. 17 to 20 show the hinge assembly of the mobile computing device of FIG. 1 in different angular orientations. It will be appreciated that the second hinge body 36 is omitted from FIGS. 17 to 20 to illustrate the elements of the spring-loaded opening mechanism 48. In FIG. 17, the first and second housing parts 14, 16 are in the closed, face-to-face angular orientation. In this orientation, the second ends 56B, 58B of the first and second followers 56, 58 are engaged with the cams 38A1, 38B1, which holds the springs 50A, 50B in the compressed state.

In FIG. 17, the engagement of the followers 56, 58 with the cams 38A1, 38B1 is illustrated with reference to the follower 58 and cam 38B1 of second hinge body 36. It will be appreciated that the engagement of the follower 56 and the cam 38A1 of the first hinge body 34 is configured likewise. As described above, the second ends 56B, 58B of the followers 56, 58 may be formed to have a concave face, and the cams 38A1, 38B1 may be formed to have a substantially arcuate surface. This configuration permits the cams 38A1, 38B1 to nest within respective second ends 56B, 58B of the followers 56, 58 when the cams 38A1, 38B1 and followers 56, 58 are fully engaged. As illustrated in FIG. 17, in the closed angular orientation, an arm 58B1 of the second follower 58 contacts a stopper 38B2 of the second cam 38B1, thereby causing a gap G between the second follower 58 and the second cam 38B1. In this configuration, the spring 50B is fully compressed and exerts a biasing force F on the second follower 58, causing the second follower 58 to experience a bending moment M, since only one side of the second follower 58 is contacting the cam 38 at stopper 38B2. This moment force supplies the bias torque to open each display when the magnetic closure is deactivated.

As discussed above, reduction of the magnetic force by actuation of the electric motor 60 permits the first and second housing parts 14, 16 to separate due to the torque of the spring-loaded opening mechanism 48, which releases the first and second springs 50A, 50B from the compressed state, thereby releasing the potential energy stored in the springs 50A, 50B. This causes the second ends 56B, 58B of the first and second followers 56, 58 to rotate around the cams 38A1, 38B1, thereby rotating the first and second hinge bodies 34, 36 to separate the first housing part 14 from the second housing part 16 at the predetermined angular orientation. Specifically, with reference to FIG. 17, when the magnetic force is relieved, the biasing force F of the spring 50B causes the second follower 58 to rotate outwardly until the concave face of the second follower 58 fully seats on the arcuate surface of the second cam 38B1, which occurs at the predetermined angular orientation, as illustrated in FIG. 18.

Figure 18:
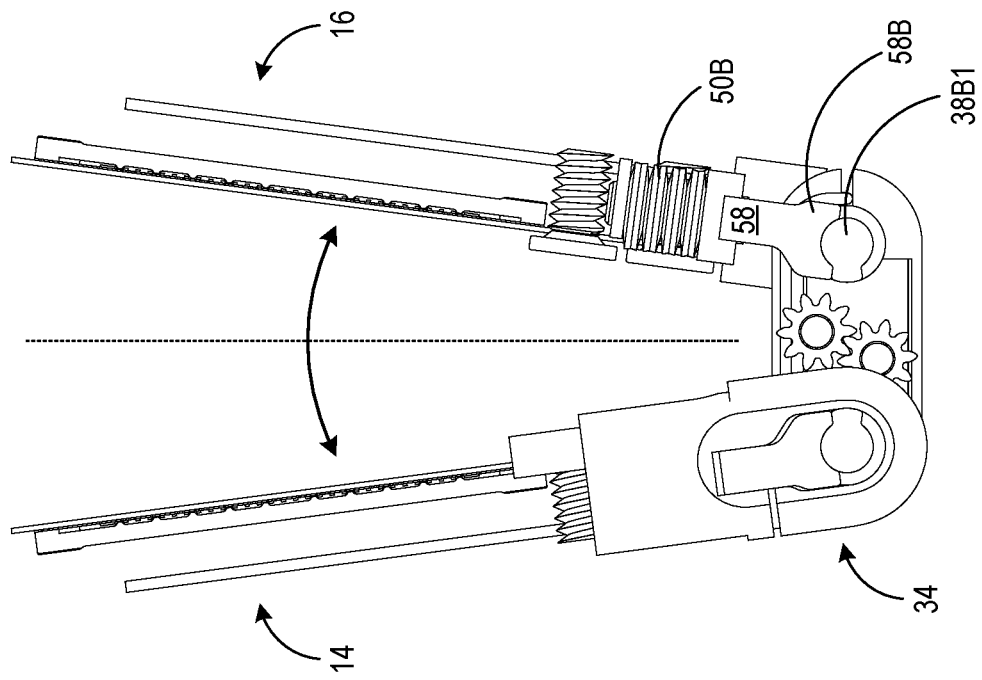

In the configuration shown in FIG. 18, the first and second housing parts 14, 16 are open at an angle of 15 degrees in the predetermined angular orientation upon release of the spring-loaded opening mechanism 48. However, it will be appreciated that the predetermined angular orientation of the first and second housing parts 14, 16 may be more or less than 15 degrees. When the first and second housing parts 14, 16 reach the predetermined angular orientation, the preloaded springs 50A, 50B cease to impart rotational motion to the first and second followers 56, 58. With this configuration, the opening of the first and second housing parts 14, 16 is coordinated such that they open to the same degree in a timed manner.

FIGS. 19 and 20 show the first and second housing parts open to side-by-side and back-to-back angular orientations, respectively. While an equal rotation of the first and second housing parts 14, 16 around the hinge assembly 18 is illustrated in FIGS. 18 to 20, it will be appreciated that the first or second housing part 14, 16 may be configured to rotate more, less, or not at all with respect to the other of the first or second housing part 14, 16.

Figure 21:
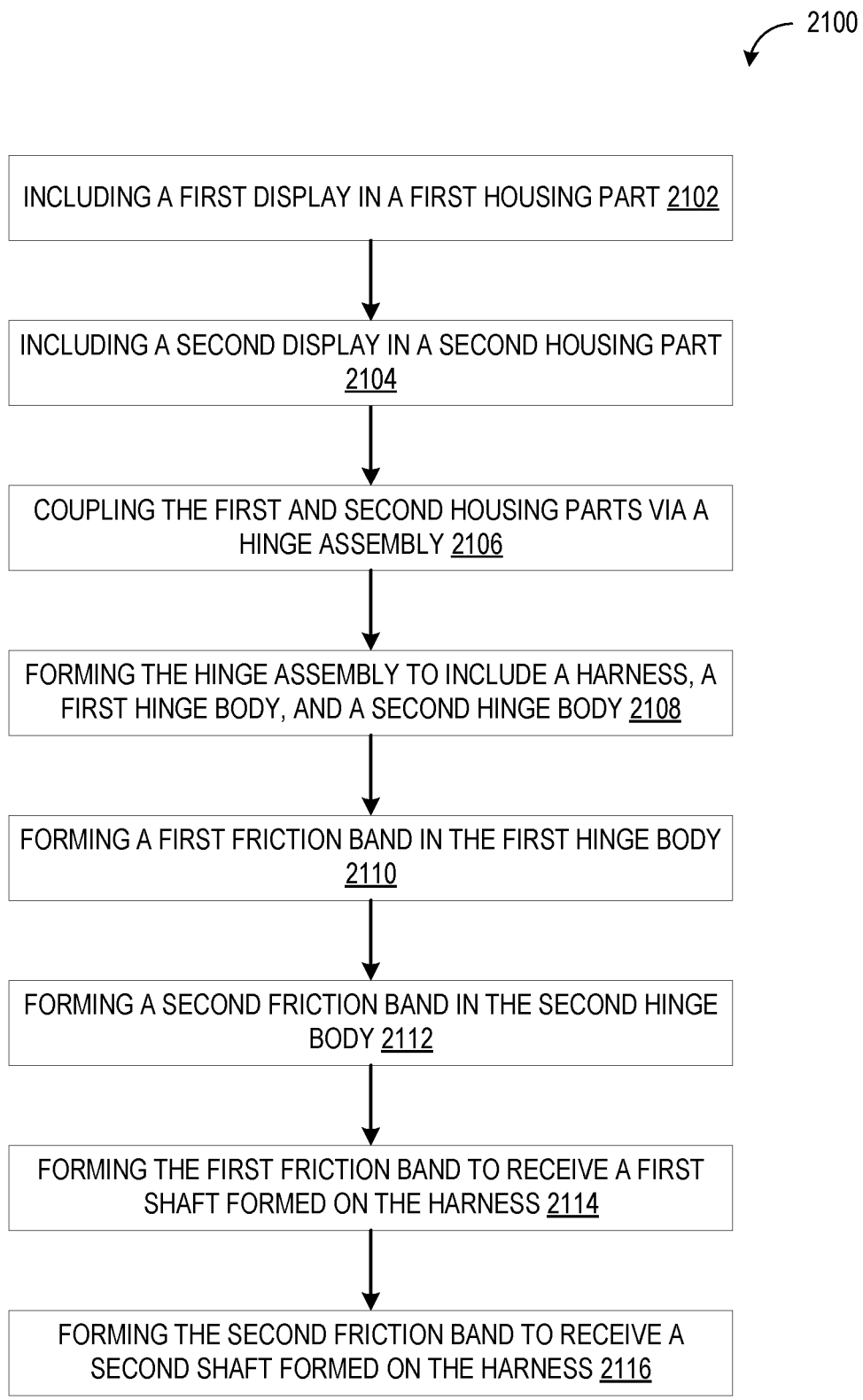
FIG. 21 shows a flowchart of a method for a mobile computing device according one example configuration of the present disclosure.

FIG. 21 shows a flowchart of a method 2100 for a mobile computing device according one example configuration of the present disclosure. Method 2100 is preferably implemented on a hinged mobile computing device, such as a smart phone device. However, it will be appreciated that the method 2100 may be implemented on any other computing device that is equipped with at least one hinge.

At step 2102, the method 2100 may comprise including a first display in a first housing part. Similarly, at step 2104, the method 2100 may comprise including a second display in a second housing part.

Continuing from step 2104 to step 2106, the method 2100 may include coupling the first and second housing parts via a hinge assembly. This step permits the first and second housing parts to rotate between angular orientations from a face-to-face angular orientation to a back-to-back angular orientation. As discussed above, the first and second displays may rotate around the hinge in a range up to 360 degrees, thereby enabling the mobile computing device to be arranged in a configuration that best suits the needs of the user for a desired function or environmental constraint.

Proceeding from step 2106 to step 2108, the method 2100 may include forming the hinge assembly to include a harness, an integrally molded first hinge body arranged in the first housing part, and an integrally molded second hinge body arranged in the second housing part. The harness may be formed with recesses to accommodate flexible printed circuitry and cable, which may be configured as a radio frequency (RF) coaxial cable. The flexible printed circuitry and the RF coaxial cable extend from the first housing part to the second housing part via the hinge assembly.

Advancing from step 2108 to step 2110, the method 2100 may include forming a first friction band in the first hinge body, the first friction band comprising a first gear formed around a first void. Similarly, at step 2112, the method 2100 may include forming a second friction band in the second hinge body, the second friction band comprising a second gear formed around a second void. The first and second gears may be configured to engage respective first and second cogs housed within a harness cover to control a rotation of the first and second hinge bodies and coordinate a timing of the rotation of the first and second housing parts between face-to-face and back-to-back orientations.

Continuing from step 2112 to 2114, the method 2100 may include forming the first friction band to receive a first shaft formed on the harness. Similarly, at step 2116, the method 2100 may include forming the second friction band to receive a second shaft formed on the harness. The first and second shafts may be configured to engage with the respective first and second friction bands, and the first and second hinge bodies may rotate around the respective first and second shafts.

In some embodiments, the methods and processes described herein may be tied to a computing system of one or more computing devices. In particular, such methods and processes may be implemented as a computer-application program or service, an application-programming interface (API), a library, and/or other computer-program product.

Figure 22:
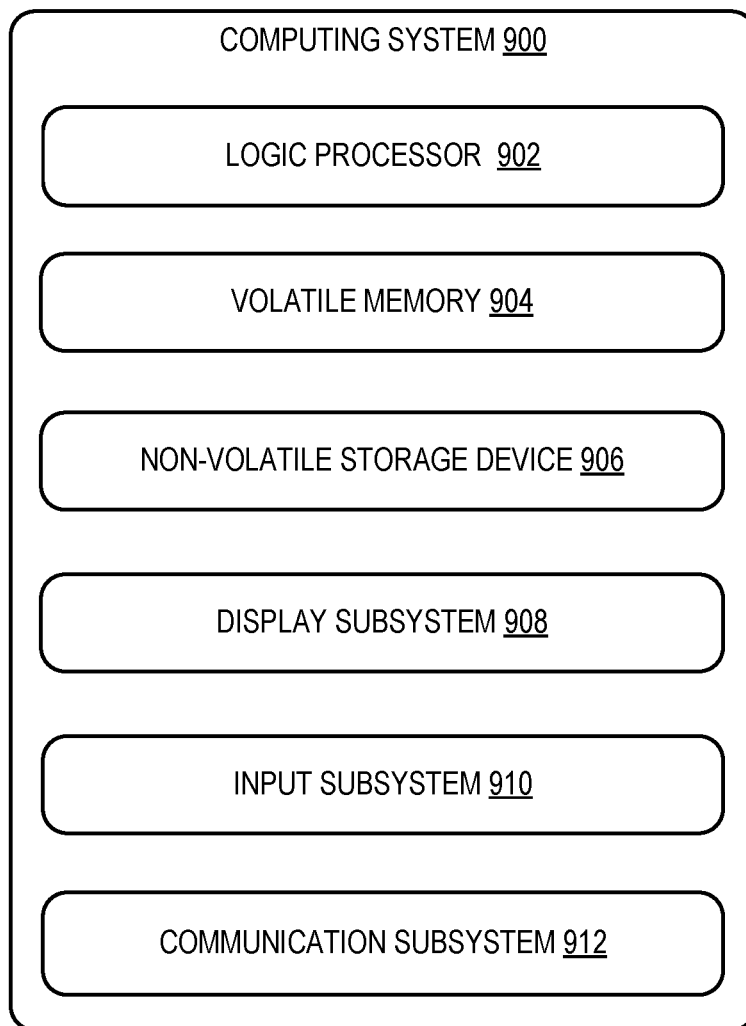
FIG. 22 shows an example computing system according to one implementation of the present disclosure.

FIG. 22 schematically shows a non-limiting embodiment of a computing system 900 that can enact one or more of the methods and processes described above. Computing system 900 is shown in simplified form. Computing system 900 may embody the computing device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 14.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a mobile computing device. The mobile computing device may comprise a first housing part including a first display, a second housing part including a second display, and a hinge assembly configured to couple the first and second housing parts and permit rotation of the first and second displays from a face-to-face orientation to a back-to-back orientation. The hinge assembly may comprise a harness, a first hinge body arranged in the first housing part, and a second hinge body arranged in the second housing part. The first hinge body may include a first friction band comprising a first gear formed around a first void. The first friction band may be configured to receive a first shaft formed on the harness. The second hinge body may include a second friction band comprising a second gear formed around a second void. The second friction band may be configured to receive a second shaft formed on the harness.

In this aspect, additionally or alternatively, engagement of the first and second shafts with the respective first and second friction bands may permit rotation of the first and second hinge bodies around respective first and second shafts. The first and second gears may be configured to engage respective first and second cogs housed within a harness cover to control rotation of the first and second hinge bodies and coordinate a timing of the rotation of the first and second housing parts between the face-to-face and back-to-back orientations.

In this aspect, additionally or alternatively, a first recess formed on the harness may configured to accommodate flexible printed circuitry, a second recess formed on the harness may be configured to hold a cable, and the flexible printed circuitry and the cable may extend from the first housing part to the second housing part via the hinge assembly. In this aspect, additionally or alternatively, the flexible printed circuitry may be substantially U-shaped and may comprise a first wing and a second wing joined via a folding portion. In an assembled state, the folding portion may reside within the first recess on the harness, the first wing may be bonded to a first support rod and arranged in the first housing part, and the second wing may be bonded to a second support rod and arranged in the second housing part. In this aspect, additionally or alternatively, the hinge assembly may further comprise a plate configured to attach to the harness and secure the flexible printed circuitry therebetween.

In this aspect, additionally or alternatively, the harness may further include a third shaft and a fourth shaft. A first hinge guide stopper may be arranged between the first hinge body and the third shaft of the harness, and a second hinge guide stopper may be arranged between the second hinge body and the fourth shaft of the harness. The first and second hinge guide stoppers may be configured to prevent the hinge assembly from contacting the first and second displays.

In this aspect, additionally or alternatively, the mobile computing device may further comprise a spring-loaded opening mechanism arranged in the hinge assembly. The spring-loaded opening mechanism may include a first spring arranged on a first pin and positioned in the first hinge body and a second spring arranged on a second pin and positioned in the second hinge body. In this aspect, additionally or alternatively, the spring-loaded opening mechanism may include a first follower and a second follower. A first end of the first follower may be disposed in a first head of the first pin, and a second end of the first follower may be engaged with a first cam on the first shaft. A first end of the second follower may be disposed in a second head of the second pin, and a second end of the second follower may be engaged with a second cam on the second shaft. When potential energy stored in the first and second springs is released, the second ends of the first and second followers may rotate around the respective first and second cams, thereby rotating the first and second hinge bodies to separate the first housing part from the second housing part to a predetermined angular orientation.

In this aspect, additionally or alternatively, the mobile computing device may further comprise an electro-magnetic closure system including a first magnet arranged in the first housing part, a second magnet arranged in the second housing part, and an electric motor. The first and second housing parts may be held in a closed position via a magnetic force between the first and second magnets. In this aspect, additionally or alternatively, engagement of a release button on one of the first and second housing parts may actuate the electric motor to move the first magnet. Movement of the first magnet may reduce the magnetic force between the first and second magnets. The reduction in the magnetic force may permit the first housing part to separate from the second housing part to a predetermined angular orientation due to a torque of the spring-loaded opening mechanism.

Another aspect provides a method for a mobile computing device. The method may comprise including a first display in a first housing part, including a second display in a second housing part, and coupling the first and second housing parts via a hinge assembly to permit rotation of the first and second displays from a face-to-face orientation to a back-to-back orientation. The method may further include forming the hinge assembly to include a harness, a first hinge body arranged in the first housing part, and a molded second hinge body arranged in the second housing part. The method may further include forming a first friction band in the first hinge body, the first friction band comprising a first gear formed around a first void. The method may further include forming a second friction band in the second hinge body, the second friction band comprising a second gear formed around a second void. The method may further include forming the first friction band to receive a first shaft formed on the harness, and forming the second friction band to receive a second shaft formed on the harness.

In this aspect, additionally or alternatively, the method may further comprise configuring the first and second shafts to engage with the respective first and second friction bands, configuring the first and second hinge bodies to rotate around respective first and second shafts, and configuring the first and second gears to engage respective first and second cogs housed within a harness cover to control rotation of the first and second hinge bodies and coordinate a timing of the rotation of the first and second housing parts between the face-to-face and back-to-back orientations.

In this aspect, additionally or alternatively, the method may further comprise forming a first recess on the harness to accommodate flexible printed circuitry, and forming a second recess on the harness to hold a cable. The flexible printed circuitry and the cable may extend from the first housing part to the second housing part via the hinge assembly. In this aspect, additionally or alternatively, the method may further comprise forming the flexible printed circuitry to be substantially U-shaped and comprise a first wing and a second wing joined via a folding portion, bonding the first wing to a first support rod, bonding the second wing to a second support rod, configuring the folding portion to reside within the first recess on the harness in an assembled state, arranging the first wing in the first housing part, arranging the second wing in the second housing part, and attaching a plate included in the hinge assembly to the harness to secure the flexible printed circuitry therebetween.

In this aspect, additionally or alternatively, the method may further comprise forming the harness to include a third shaft and a fourth shaft, arranging a first hinge guide stopper between the first hinge body and the third shaft of the harness, and arranging a second hinge guide stopper between the second hinge body and the fourth shaft of the harness. The first and second hinge guide stoppers may be configured to prevent the hinge assembly from contacting the first and second displays.

In this aspect, additionally or alternatively, the method may further comprise arranging a spring-loaded opening mechanism in the hinge assembly, including in the spring-loaded opening mechanism a first spring and a second spring, arranging the first spring on a first pin positioned in the first hinge body, and arranging the second spring on a second pin positioned in the second hinge body. In this aspect, additionally or alternatively, the method may further comprise including in the spring-loaded opening mechanism a first follower and a second follower, disposing a first end of the first follower in a first head of the first pin, configuring a second end of the first follower to engage with a first cam on the first shaft, disposing a first end of the second follower in a second head of the second pin, and configuring a second end of the second follower to engage with a second cam on the second shaft. When potential energy stored in the first and second springs is released, the second ends of the first and second followers may rotate around the respective first and second cams, thereby rotating the first and second hinge bodies to separate the first housing part from the second housing part to a predetermined angular orientation.

In this aspect, additionally or alternatively, the method may further comprise including a first magnet, a second magnet, and an electric motor in an electro-magnetic closure system. The method may further include arranging the first magnet in the first housing part, and arranging the second magnet in the second housing part. The first and second housing parts may be held in a closed position via a magnetic force between the first and second magnet. In this aspect, additionally or alternatively, the method may further comprise configuring a release button to actuate the electric motor to move the first magnet. Movement of the first magnet may reduce the magnetic force between the first and second magnets, and the reduction in the magnetic force may permit the first and second hinge bodies to separate the first housing part from the second housing part to the predetermined angular orientation due to a torque of the spring-loaded opening mechanism.

Another aspect provides a mobile computing device. The mobile computing device may comprise a first housing part including a first display, a second housing part including a second display, and a hinge assembly configured to couple the first and second housing parts and permit rotation of the first and second displays between angular orientations from a face-to-face orientation to a back-to-back orientation. The hinge assembly may comprise a harness, a first hinge body arranged in the first housing part, and a second hinge body arranged in the second housing part. The mobile computing device may further comprise a spring-loaded opening mechanism arranged in the hinge assembly. The spring-loaded opening mechanism may include a first spring arranged in the first housing part and a second spring arranged in the second housing part. The mobile computing device may further comprise an electro-magnetic closure system including a first magnet arranged in the first housing part and a second magnet arranged in the second housing part. The first hinge body may include a first friction band comprising a first gear formed around a first void. The first friction band may be configured to receive a first shaft formed on the harness. The second hinge body may include a second friction band comprising a second gear formed around a second void. The second first friction band may be configured to receive a second shaft formed on the harness. A magnetic force between the first and second magnet may be strong enough to overcome a torque of the spring-loaded release mechanism. Actuation of the electric motor may move the first magnet and reduce the magnetic force, and potential energy stored in the first and second springs may be released, causing the first and second friction bands to rotate around the respective shafts and thereby rotating the first and second hinge bodies to separate the first housing part from the second housing part to a predetermined angular orientation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hinge assembly for coupling a first housing part and a second housing part of a computing device, the hinge assembly comprising:
   a harness including a first shaft, a second shaft, a third shaft, and a fourth shaft;
   a first hinge body including a first friction band comprising a first gear formed around a first void, the first friction band being configured to receive the first shaft of the harness; and
   a second hinge body including a second friction band comprising a second gear formed around a second void, the second friction band being configured to receive the second shaft of the harness, wherein
   engagement of the first and second shafts with the respective first and second friction bands permits rotation of the first and second hinge bodies around the respective first and second shafts,
   the first and second gears are configured to engage respective first and second cogs to control rotation of the first and second hinge bodies and coordinate a timing of the rotation of the first and second housing parts, a first hinge guide stopper is arranged between the first hinge body and the third shaft of the harness,
a second hinge guide stopper is arranged between the second hinge body and the fourth shaft of the harness, and
the first and second hinge guide stoppers are configured to prevent the hinge assembly from contacting first and second displays included in the first and second housing parts, respectively.

2. The hinge assembly of claim 1, wherein
a first recess formed on the harness is configured to accommodate flexible printed circuitry,
a second recess formed on the harness is configured to hold a cable, and
the flexible printed circuitry and the cable extend from the first housing part to the second housing part via the hinge assembly.

3. The hinge assembly of claim 2, wherein
the flexible printed circuitry is substantially U-shaped and comprises a first wing and a second wing joined via a folding portion, and
in an assembled state, the folding portion resides within the first recess on the harness, the first wing is bonded to a first support rod and arranged in the first housing part, and the second wing is bonded to a second support rod and arranged in the second housing part.

4. The hinge assembly of claim 2, wherein
the hinge assembly further comprises a plate configured to attach to the harness and secure the flexible printed circuitry therebetween.

5. The hinge assembly of claim 1, further comprising:
a spring-loaded opening mechanism including a first spring arranged on a first pin and positioned in the first hinge body and a second spring arranged on a second pin and positioned in the second hinge body.

6. The hinge assembly of claim 5, wherein
the spring-loaded opening mechanism includes a first follower and a second follower,
a first end of the first follower is disposed in a first head of the first pin,
a second end of the first follower is engaged with a first cam on the first shaft,
a first end of the second follower is disposed in a second head of the second pin,
a second end of the second follower is engaged with a second cam on the second shaft, and
when potential energy stored in the first and second springs is released, the second ends of the first and second followers rotate around the respective first and second cams, thereby rotating the first and second hinge bodies to separate the first housing part from the second housing part to a predetermined angular orientation.

7. The hinge assembly of claim 1, wherein
the first and second housing parts are configured to rotate between face-to-face and side-by-side orientations.

8. The hinge assembly of claim 1, wherein
the first and second housing parts are configured to rotate between face-to-face and back-to-back orientations.

9. The hinge assembly of claim 1, wherein
the first and second hinge bodies are injection molded.

10. A method for manufacturing a hinge assembly for coupling a first housing part and a second housing part of a computing device, the method comprising:
forming a harness to include a first shaft, a second shaft, a third shaft, and a fourth shaft;
forming a first hinge body to include a first friction band comprising a first gear formed around a first void, the first friction band being configured to receive the first shaft of the harness;
forming a second hinge body to include a second friction band comprising a second gear formed around a second void, the second friction band being configured to receive the second shaft of the harness;
arranging a first hinge guide stopper between the first hinge body and the third shaft of the harness; and
arranging a second hinge guide stopper between the second hinge body and the fourth shaft of the harness, wherein
engagement of the first and second shafts with the respective first and second friction bands permits rotation of the first and second hinge bodies around the respective first and second shafts,
the first and second gears are configured to engage respective first and second cogs to control rotation of the first and second hinge bodies and coordinate a timing of the rotation of the first and second housing parts, and
the first and second hinge guide stoppers are configured to prevent the hinge assembly from contacting first and second displays included in the first and second housing parts, respectively.

11. The method of claim 10, the method further comprising:
forming a first recess on the harness to accommodate flexible printed circuitry; and
forming a second recess on the harness to hold a cable, wherein
the flexible printed circuitry and the cable extend from the first housing part to the second housing part via the hinge assembly.

12. The method of claim 11, the method further comprising:
forming the flexible printed circuitry to be substantially U-shaped and comprise a first wing and a second wing joined via a folding portion;
bonding the first wing to a first support rod;
bonding the second wing to a second support rod;
configuring the folding portion to reside within the first recess on the harness in an assembled state;
arranging the first wing in the first housing part;
arranging the second wing in the second housing part; and
attaching a plate included in the hinge assembly to the harness to secure the flexible printed circuitry therebetween.

13. The method of claim 10, the method further comprising:
arranging a spring-loaded opening mechanism in the hinge assembly;
including in the spring-loaded opening mechanism a first spring and a second spring;
arranging the first spring on a first pin positioned in the first hinge body; and
arranging the second spring on a second pin positioned in the second hinge body.

14. The method of claim 13, the method further comprising:
including in the spring-loaded opening mechanism a first follower and a second follower;
disposing a first end of the first follower in a first head of the first pin;
configuring a second end of the first follower to engage with a first cam on the first shaft;

disposing a first end of the second follower in a second head of the second pin; and configuring a second end of the second follower to engage with a second cam on the second shaft, wherein when potential energy stored in the first and second springs is released, the second ends of the first and second followers rotate around the respective first and second cams, thereby rotating the first and second hinge bodies to separate the first housing part from the second housing part to a predetermined angular orientation.

15. The method of claim 10, the method further comprising:

forming the hinge assembly to rotate the first and second housing parts between face-to-face and side-by-side orientations.

16. The method of claim 10, the method further comprising:

forming the hinge assembly to rotate the first and second housing parts between face-to-face and back-to-back orientations.

17. The method of claim 10, the method further comprising:

forming the first and second hinge bodies via an injection molding process.

18. A hinged device comprising:

a first housing part;

a second housing part;

a hinge assembly configured to couple the first and second housing parts and permit rotation of the first and second housing parts between angular orientations, the hinge assembly comprising a harness, a first hinge body arranged in the first housing part, and a second hinge body arranged in the second housing part; and a spring-loaded opening mechanism arranged in the hinge assembly, the spring-loaded opening mechanism including a first spring arranged in the first housing part and a second spring arranged in the second housing part, wherein the harness includes a first shaft, a second shaft, a third shaft, and a fourth shaft, the first hinge body includes a first friction band comprising a first gear formed around a first void, the first friction band being configured to receive the first shaft of the harness, the second hinge body includes a second friction band comprising a second gear formed around a second void, the second first friction band being configured to receive the second shaft of the harness, when potential energy stored in the first and second springs is released, the first and second friction bands to rotate around the respective shafts, thereby rotating the first and second hinge bodies to separate the first housing part from the second housing part to a predetermined angular orientation, a first hinge guide stopper is arranged between the first hinge body and the third shaft of the harness, a second hinge guide stopper is arranged between the second hinge body and the fourth shaft of the harness, and the first and second hinge guide stoppers are configured to prevent the hinge assembly from contacting first and second displays included in the first and second housing parts, respectively.

* * * * *